No. 610,382. Patented Sept. 6, 1898.
L. BURGESS.
PROPELLING MECHANISM FOR BICYCLES OR SIMILAR VEHICLES.
(Application filed July 13, 1897.)
(No Model.)
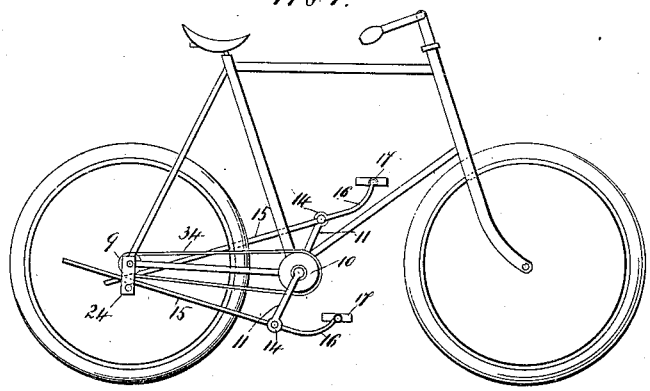
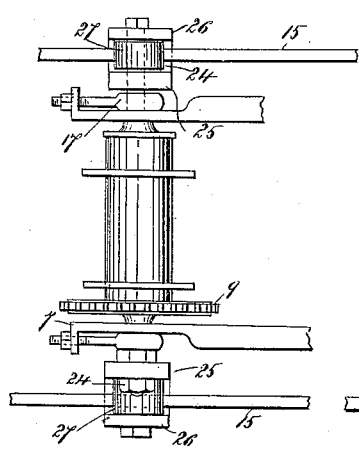
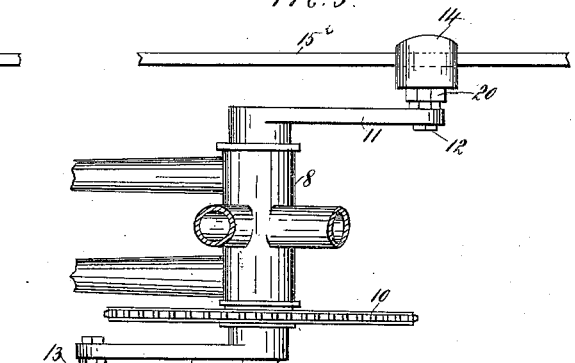
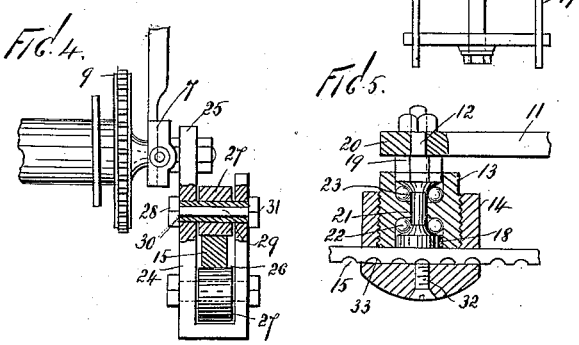
WITNESSES
INVENTOR
Louis Burgess.
BY
Edgar Tate
ATTORNEYS

UNITED STATES PATENT OFFICE.

LOUIS BURGESS, OF WATERLOO, NEW YORK.

PROPELLING MECHANISM FOR BICYCLES OR SIMILAR VEHICLES.

SPECIFICATION forming part of Letters Patent No. 610,382, dated September 6, 1898.

Application filed July 13, 1897. Serial No. 644,403. (No model.)

*To all whom it may concern:*

Be it known that I, LOUIS BURGESS, a citizen of the United States, residing at Waterloo, in the county of Seneca and State of New York, have invented certain new and useful Improvements in Propelling Mechanism for Bicycles or Similar Vehicles, of which the following is a full and complete specification, such as will enable those skilled in the art to which it appertains to make and use the same.

This invention relates to propelling mechanism for bicycles and similar vehicles; and the object thereof is to provide improved means for increasing the leverage of the pedal-cranks on the downward stroke and for decreasing the same on the upward movement thereof.

The invention is fully disclosed in the following specification, of which the accompanying drawings form a part, in which—

Figure 1 is a side view of a bicycle provided with my improved propelling mechanism; Fig. 2, a plan view of the supports of the axle or shaft of the drive-wheel and the parts connected therewith; Fig. 3, a plan view of the support of the pedal-shaft and the parts connected therewith, part of the construction being shown in section; Fig. 4, a rear view of one end of the pedal and the parts connected therewith, part of the construction being shown in section; and Fig. 5, a sectional view of a detail of the construction shown in Fig. 3, on an enlarged scale.

In the drawings forming part of this specification the separate parts of my improvement are designated by the same numerals of reference in each of the views, and in said drawings I have shown in Fig. 1 a bicycle the frame and wheels of which are of the usual form and construction, and the support of the pedal-shaft and the support of the shaft or axle of the drive-wheel are also of the usual form.

In Fig. 2 I have shown at 7 the supports of the axle or shaft of the drive-wheel and at 8 in Fig. 3 the tubular hub through which the pedal-shaft passes, and the shaft or axle of the drive-wheel is provided with the usual sprocket-wheel 9 and the pedal-shaft with the usual sprocket-wheel 10, and in the practice of my invention I connect with the outer end of each of the pedal-cranks 11 a short shaft 12, which is best shown in Fig. 5, and mounted on each of these shafts is a sleeve 13, with which is connected a cap 14, and passing through each of the caps 14 is a lever 15, and the forward ends of the levers 15 are curved upwardly, as shown at 16 in Fig. 1, and the pedals 17 are connected therewith.

The shafts 12 are each provided at their outer ends with a circular head 18 and near their inner ends with a detachable collar 19, which is held in place by a set-nut 20, and the sleeve 13 is provided centrally of the inner side thereof with an inwardly-directed annular shoulder or projection 21, and between the head 18 of the shaft 12 and said annular shoulder or projection are ball-bearings 22, and between said annular shoulder or projection and the detachable collar 19 are similar ball-bearings 23.

Suspended from each end of the shaft or axle of the drive-wheel or the supports thereof is a yoke-shaped support 24, which preferably consists of a long arm 25 and a short arm 26, and mounted in each of said yoke-shaped supports are two antifriction-rollers 27, and the rear ends of the levers 15 pass through these yoke-shaped supports between said antifriction-rollers 27, as clearly shown in Figs. 2 and 4.

The antifriction-rollers 27 are mounted on tubular shafts 28, and these tubular shafts 28 are provided with perforations at one side thereof, as shown at 29, and said shafts are provided at one end with a head 30 and are open at the opposite end and adapted to be closed by a screw-threaded and headed plug 31, and the object of forming the shafts 28 in this manner is to provide means for oiling or lubricating the rollers 27, and in this operation the screw-threaded and headed plugs 31 are removed and the oil or other lubricant is placed in said tubular shafts.

The levers 15 are held in the caps 14 by headed set-screws 32, which pass through the outer ends of said caps and which bear in cavities or recesses 33 formed in said levers, or these cavities or recesses may pass entirely through said levers, and by means of this construction the length of the levers between the pedals and the caps may be increased or decreased, as desired, and by means of this adjustment the leverage of the pedal-cranks may be increased or decreased on the downward stroke, as will be readily understood.

The operation will be readily understood from the foregoing description when taken in connection with the accompanying drawings and the following statement thereof.

The sprocket-wheels 9 and 10 are connected by the usual drive-chain 34, and the levers 15 being free to slide in the supports 24 it will be seen that on the downward stroke of the pedals the distance between the pedals and the pedal-shaft is increased, while on the upward stroke this distance is decreased. The distance between the pedals and the pedal-shaft begins to increase before the pedal-cranks reach the vertical position and gradually increases until the pedal-cranks reach the horizontal position, after which said distance begins to decrease, and in the upward stroke the distance between the pedals and the pedal-shaft is comparatively slight, if any, this distance depending entirely on the length of the levers 15 between the caps or supports 14, through which they pass, and the points at which the pedals are connected therewith.

My improved propelling mechanism is simple in construction and operation and is perfectly adapted to accomplish the result for which it is intended, and it will be apparent that changes in and modifications of the details thereof as herein described may be made without departing from the spirit of my invention or sacrificing its advantages.

Having fully described my invention, I claim as new and desire to secure by Letters Patent—

1. In a propelling mechanism for bicycles and similar vehicles, the combination of a pedal-shaft, connections between said shaft and the drive-wheel, pedal-crank shafts connected with said pedal-cranks, annular collars on the outer ends of said shafts, sleeves rotating on said shafts and provided with a central inwardly-directed annular shoulder, ball-bearings between said collar and said shoulder, a collar on said shaft, ball-bearings between said collar and said annular shoulder, means whereby said collar may be secured against lateral motion, caps adapted to be secured to said sleeves and longitudinally movable thereon, and levers supported by said caps and longitudinally adjustable, one end of said levers being provided with suitable supports through which they are adapted to slide, and the other ends thereof being provided with pedals, substantially as described.

2. In a propelling mechanism for bicycles and similar vehicles, the combination with the pedal-shaft provided with the usual pedal-cranks, shafts connected with said cranks, revoluble sleeves mounted on said shafts, caps which are adapted to be connected with the outer end of said sleeves and to be longitudinally adjustable thereon, levers which pass through said caps and are longitudinally adjustable therein, said levers being provided at one end with supports through which they are longitudinally movable, and at the opposite end with pedals, substantially as described.

3. In a propelling mechanism for bicycles and similar vehicles, the combination with a pedal-shaft provided with the usual pedal-cranks, shafts connected with said cranks, revoluble sleeves mounted on said shafts, caps which are adapted to be connected with the outer end of said sleeves and to be longitudinally adjustable thereon, levers which pass through said caps and are longitudinally adjustable therein, said levers being provided at one end with supports secured to the rear portion of the frame of the vehicle through which they are longitudinally movable, and said supports being provided with antifriction-rollers between which said levers pass, substantially as described.

In testimony that I claim the foregoing as my invention I have signed my name, in presence of the subscribing witnesses, this 9th day of July, 1897.

LOUIS BURGESS.

Witnesses:
G. PIERSON BELL,
MICHAEL L. FLYNN.